W. E. KNOELL.
AEROPLANE WING.
APPLICATION FILED SEPT. 7, 1920.
1,390,563. Patented Sept. 13, 1921.
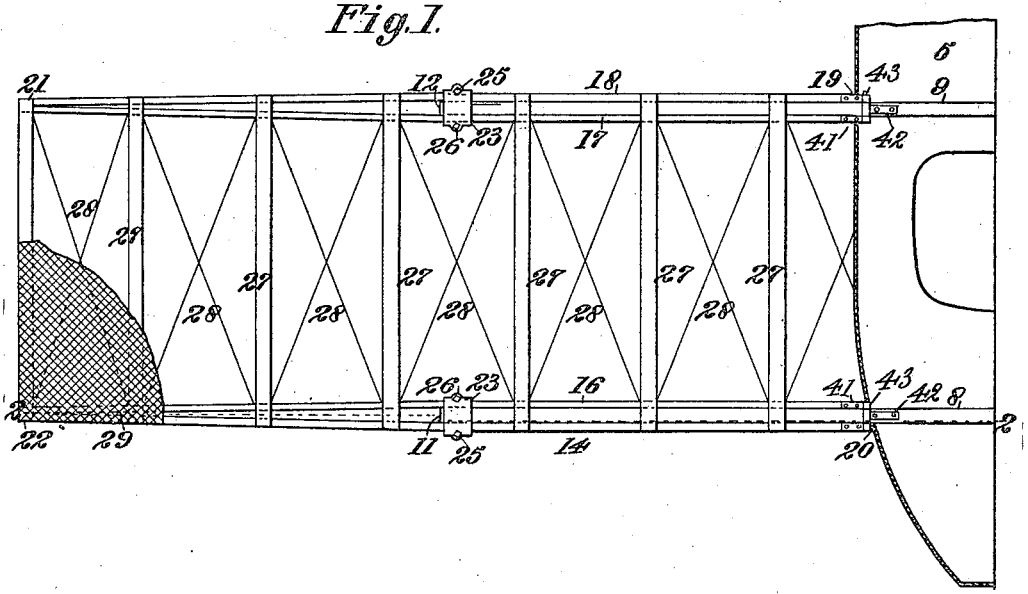
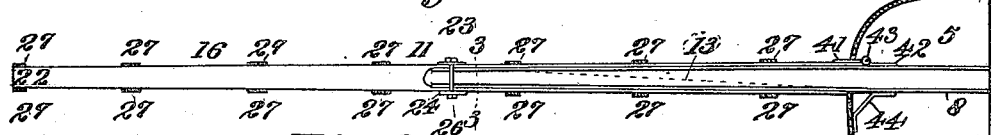
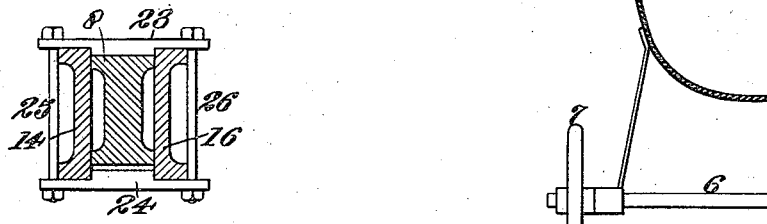
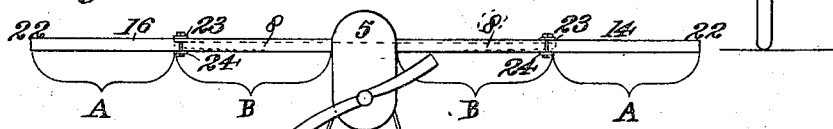
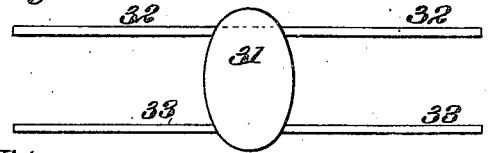
Inventor.
W. E. Knoell
Witness.

UNITED STATES PATENT OFFICE.

WALTER E. KNOELL, OF TACOMA, WASHINGTON.

AEROPLANE-WING.

1,390,563.　　Specification of Letters Patent.　Patented Sept. 13, 1921.

Application filed September 7, 1920. Serial No. 408,717.

*To all whom it may concern:*

Be it known that I, WALTER E. KNOELL, a citizen of the United States, and resident of Tacoma, county of Pierce, State of Washington, have invented a new and useful Aeroplane-Wing, of which the following is a specification.

This invention relates to improvements in aeroplane wings or supporting planes, and has for its principal object to produce an aeroplane having wings supported entirely by wing supports extending from the fuselage, and with said wing supports positioned within the wings in such a manner as to obviate the necessity of the use of struts and guy wires.

It is a well known fact that in the present types of aeroplanes where the wings are supported by struts and guy wires, resistance in the same is considerable, and the elimination of these exposed parts will result in an increase in speed and at the same time the danger of breakage is eliminated.

Another object is to construct an aeroplane in such a manner that the wing stress incident to flying will be transferred so that the leverage with respect to the fuselage is decreased by the transfer of the stress.

Other objects and advantages will be seen as the description proceeds.

In the accompanying drawing, which illustrates the salient features of the principle involved, Figure 1 is a fragmentary view of a portion of an aeroplane illustrating the application of the invention, Fig. 2 is a cross section on the line 2—2 of Fig. 1, Fig. 3 is a cross section on the line 3—3 of Fig. 2, Fig. 4 is a front plan view of an aeroplane as equipped with the present wing construction, and Fig. 5 is a diagrammatic view of a bi-plane also employing the present wing construction.

In the drawings, like numerals refer to corresponding parts in the several views.

It is well known that the strain at the point where the usual wing of an aeroplane is attached to the fuselage is considerable, especially during the flight, where sudden turnings are executed, and many fatal accidents have occurred through the failure of the wing at this point.

By referring to Fig. 1, it will be noted that the numeral 5 designates a fuselage of an ordinary aeroplane. This fuselage is supported from the ground by the usual landing gear as here indicated by an axle 6 having a wheel 7. The landing gear, however, is immaterial to the present invention and the same also applies to the general arrangement of the fuselage.

The numerals 8 and 9 designate wing supports attached to and passing through the fuselage as shown in Figs. 1 and 2. These wing supports are preferably slightly tapered toward their extremities, the tapered ends being shown at 11 and 12.

In order to further strengthen these wing supports I have shown in dotted line the tension cable 13, which extends from a point within the fuselage to a point substantially two-thirds of the length of the wing supports. The use of tension members of this character is well known and needs no further comment.

The numerals 14, 16, 17 and 18 refer to wing beams, which extend from the sides of the fuselage as shown at 19 and 20 to points 21 and 22. It will be noted that these beams parallel the wing supports 8 and 9 for a distance substantially half their length and then converge and are joined together. Caps 23 and 24 are placed above and below these beams 14, 16, 17 and 18 at a point adjacent the ends of the wing supports 11 and 12. These caps are securely held together by bolts 25 and 26, the same also serving to keep the beams in alinement, as shown in Fig. 3. It will be noted from this figure that the beams 14 and 16 are of greater width than the wing support 8 with the result that an independent up and down flexing of these members is allowed between the cap 23 and hinge members 41 and 42. These beams support the usual ribs 27, and suitable guy wires 28 serve to make up the wing structure which, of course, is covered with a suitable fabric as shown at 29.

By referring to Fig. 4, it will readily be seen how the wings of each side of the machine are supported from substantially their middle point, which results in the transfer of the pressure from the entire length of the wing to a support substantially half the length of the wing, which support is of sufficient strength to be well within the limits of safety.

In Fig. 5 I have shown a bi-plane wherein the numeral 31 represents the fuselage and numerals 32 and 33 the upper and lower wing surfaces. This view illustrates the entire absence of struts and guy wires, using a wing support as outlined above.

The theory of the above outlined disclosure may be related as follows:

When the machine is upon the ground, the weight of the wings will be upon the upper surface of the tips of the wing supports; that is, the wing will settle so that the under sides of the caps 23 rest upon the upper surfaces of tips 11 and 12. As will be seen in Figs. 1 and 2, the wings are attached to the fuselage at their points 19 and 20 by means of hinged members 41, 42 and 43, and with a brace 44.

When the machine is in the air the air pressure will cause the caps 24 to press against the under sides of the wing support ends 11 and 12, thereby transmitting all of the lifting force from the wing to this short wing support which in turn transmits the lifting power to the fuselage.

In some respects it may be desirable to design the wings in such a manner that the lifting pressure in the portions A and B of the wings will be equal. This, however, is not an essential point, as it might be preferable to have a greater pressure along either of these portions. A greater pressure along B of the wing would cause an upward pressure of the beams at the coupling points, thus relieving some of the pressure on the wing supports at their extremities. A greater pressure along A would cause a downward pressure of beams at coupling points.

From the above it will be seen that all head resistance common to struts and guy wires has been eliminated, and at the same time I have retained the useful flexibility of the wing, which is of great value in flying. This flexibility also allows the absorption of sudden strains without the tendency of snapping.

Having described my invention, what I claim as new and novel is:

1. In an aeroplane, a fuselage, two beams mounted in said fuselage extending to both sides of the same, two wings inclosing said extended beams, and secured to their tips at approximately the center of gravity of said wings.

2. In an aeroplane, a fuselage, two beams mounted in said fuselage extending to both sides of the same, two wings inclosing said extended beams and flexibly secured to their tips at approximately the center of gravity of said wings.

3. In an aeroplane, a fuselage, two beams supported in said fuselage extending to both sides of the same, two wings, each having two pairs of beams therein, each pair of beams adapted to inclose one of said extended beams, means for securing said pairs of beams to the tips of the single beams at approximately the center of gravity of said wings.

4. In an aeroplane, a fuselage, a wing supported on two pairs of beams, two single beams extending from the fuselage and firmly secured thereto, each pair of beams adapted to receive and inclose one of said single beams and to be secured to the tips of said beams at approximately the center of gravity of said pair of beams.

5. In an aeroplane, a fuselage, two pairs of beams, a wing supported thereon, two single beams extending from the fuselage and firmly secured thereto, each pair of beams adapted to receive and inclose one of said single beams and to be clamped to the tips of said beams at approximately its center of gravity, the clamping means adapted to allow of a slight vertical motion of said pairs of beams with reference to the single beams.

6. In a device of the character described, the combination of an aeroplane having a fuselage, parallel wing supports rigidly secured to said fuselage and extending outwardly therefrom, parallel wing beams mounted adjacent to each of said wing supports and extending outwardly from said fuselage a distance substantially twice that of said supports, caps attached to said beams and straddling the ends of said supports, said caps being capable of transferring any wing stresses from said beams to said supports.

WALTER E. KNOELL.